United States Patent
Feyh

(10) Patent No.: US 7,167,327 B2
(45) Date of Patent: Jan. 23, 2007

(54) INTEGRATED CIRCUIT AND METHOD FOR REMODULATING BITS AND HARD DISK DRIVE INCORPORATING THE SAME

(75) Inventor: German S. Feyh, Boulder, CO (US)

(73) Assignee: Agere Systems Inc., Allentown, PA (US)

( * ) Notice: Subject to any disclaimer, the term of this patent is extended or adjusted under 35 U.S.C. 154(b) by 132 days.

(21) Appl. No.: 10/337,071

(22) Filed: Jan. 6, 2003

(65) Prior Publication Data

US 2004/0130816 A1  Jul. 8, 2004

(51) Int. Cl.
  *G11B 5/09* (2006.01)
(52) U.S. Cl. .......................... 360/46; 360/51
(58) Field of Classification Search .............. 360/29, 360/65, 46, 67; 375/341; 327/307; 714/746
  See application file for complete search history.

(56) References Cited

U.S. PATENT DOCUMENTS

| 4,870,657 | A | * | 9/1989 | Bergmans et al. | 375/233 |
|---|---|---|---|---|---|
| 5,455,844 | A | * | 10/1995 | Ishikawa et al. | 375/232 |
| 5,696,639 | A | * | 12/1997 | Spurbeck et al. | 360/51 |
| 5,818,656 | A | * | 10/1998 | Klaassen et al. | 360/67 |
| 6,094,316 | A | * | 7/2000 | Pham et al. | 360/46 |
| 6,442,198 | B1 | * | 8/2002 | Harman | 375/233 |
| 6,618,436 | B2 | * | 9/2003 | Greiss et al. | 375/229 |
| 6,690,753 | B2 | * | 2/2004 | Kwon et al. | 375/344 |
| 6,707,624 | B2 | * | 3/2004 | Erden et al. | 360/31 |
| 6,741,645 | B2 | * | 5/2004 | Tan et al. | 375/233 |
| 6,870,881 | B1 | * | 3/2005 | He | 375/233 |
| 2004/0096022 | A1 | * | 5/2004 | Zhang | 375/353 |

FOREIGN PATENT DOCUMENTS

GB  2 356 324 A  * 10/1999

OTHER PUBLICATIONS

Matzner, Rolf et al, Blind Linear and Decision Feedback Equalizers Using Fourth-Order Moments and Their Performance on Twisted Pair Lines, IEEE, 1994, pp. 667 and 671.*
"Read Channel Issues in Perpendicular Magnetic Recording" by Srinivasan Gopalaswamy and Peter McEwen; IEEE Transactions on Magnetics, vol. 37, No. 4; Jul. 2001; pp. 1929-1931.

* cited by examiner

Primary Examiner—William Korzuch
Assistant Examiner—Adam R. Giesy

(57) ABSTRACT

A remodulator embodied in an integrated circuit (IC), a method for remodulating bits and a controller and disk drive incorporating the IC or the method. In one embodiment, the IC includes: (1) a remodulator that processes incoming bits to yield remodulated outgoing bits, the remodulator including a selected one of a decision feedback loop and an error feedback loop and (2) a feedforward loop coupled to an input of the remodulator and having a baseline wander filter, the baseline wander filter cooperating with the selected one of the decision feedback loop and the error feedback loop to reduce a bit error rate of the remodulated outgoing bits.

21 Claims, 4 Drawing Sheets

INTEGRATED CIRCUIT AND METHOD FOR REMODULATING BITS AND HARD DISK DRIVE INCORPORATING THE SAME

TECHNICAL FIELD OF THE INVENTION

The present invention is directed, in general, to data remodulation and, more specifically, to an integrated circuit (IC) and method for remodulating bits and a controller and hard disk drive incorporating the IC or the method.

BACKGROUND OF THE INVENTION

Baseband line coding is a simple form of encoding a signal for communication that is conventionally undertaken in various processes and devices ranging from cellular telephones to computers. Baseband line coding, or simply "baseline" coding, yields several benefits. Those benefits include spectrum shaping and relocation without requiring filtering, simplified clock signal recovery, improved bandwidth usage and error detection capabilities.

In addition, baseband line coding allows DC components in the signal to be eliminated. Though this improves AC coupling, the elimination of DC component from the signal spectrum can cause baseline wander. Baseline wander shifts the position of the signal relative to thresholds, causing the magnitude of the signal to be misinterpreted and ultimately leading to severe erosion of fidelity and an unacceptably low signal to noise ratio.

Reading data from a hard disk drive is one example of baseline coding where baseline wander is routinely encountered. The problem becomes more acute as the lower part of the signal spectrum is used, such as when perpendicular magnetic recording is used. Typically, bits of information are stored on a magnetic medium of a hard disk drive. The bits are read as a voltage (or current) signal by a read/write head. The signal is amplified and sent to an analog to digital (A/D) converter, where it is converted from analog to digital form (a sequence of numbers, or bits). The digital bits are detected or remodulated and decoded into the information that was stored on the hard disk drive.

In the amplification of the low voltage representing the bits of information, high pass filters are employed which remove a portion of a signal spectrum around DC. This loss of the signal spectrum around DC leads to a degradation of the bit error rate (BER) when detecting the digital bits. To improve the BER, several methods have been designed to compensate for baseline wander and specifically compensate for the loss of the signal spectrum around DC. Decision feedback based schemes and error feedback based schemes are examples of two schemes used with a detector to compensate for the DC loss of signal energy and the resulting loss in BER.

These schemes, however, suffer from a delay in a feedback path of the detector. The feedback delay includes intrinsic latencies associated with the detector and the extrinsic latencies of computational delays such as an add of the feedback path. A portion of the delay in each of the schemes is typically caused by the detector having an implementation of a Viterbi algorithm in silicon. Many previous baseline wander compensation schemes, nevertheless, did not consider the delay associated with the detector. As discussed in *Read Channel Issues in Perpendicular Magnetic Recording*, Gopalaswamy, et al., IEEE Transactions on Magnetics, Vol. 37, No. 4, July 2001, at 1929 (incorporated herein by reference), the delay may degrade the above schemes until employing the schemes is worse than uncompensated detection of the signal. The Viterbi algorithm associated with the detector, however, assists in accurately and efficiently determining the digital bits received through the channel.

Accordingly, what is needed in the art is an improved system and method for remodulating data without being negatively effected by detector delay.

SUMMARY OF THE INVENTION

To address the above-discussed deficiencies of the prior art, the present invention provides a remodulator embodied in an IC, a method for remodulating bits and a controller and hard disk drive incorporating the IC or the method. In one embodiment, the IC includes: (1) a remodulator that processes incoming bits to yield remodulated outgoing bits, the remodulator including a selected one of a decision feedback loop and an error feedback loop and (2) a feedforward loop coupled to an input of the remodulator and having a baseline wander filter, the baseline wander filter cooperating with the selected one of the decision feedback loop and the error feedback loop to reduce a bit error rate of the remodulated outgoing bits.

The present invention therefore adds a feedforward path into a remodulator to introduce an extra degree of freedom into the processing that the remodulator can perform and thereby enhance the remodulator's ability to process signals at higher rates.

In one embodiment of the present invention, the remodulator includes a Viterbi detector. Those skilled in the pertinent art are familiar with Viterbi detectors and their use in demodulation/remodulation. The present invention, however, can also work with other decoders.

In one embodiment of the present invention, the baseline wander filter is a high pass filter having a pole setting that is at most 0.2% of a channel clock rate. Other pole settings are, of course, within the broad scope of the present invention.

In one embodiment of the present invention, the incoming bits are read from a magnetic storage medium. In a more specific embodiment, the magnetic storage medium is a hard disk. In a more specific embodiment, the incoming bits are encoded in perpendicularly recorded domains in the magnetic storage medium. Those skilled in the pertinent art will understand, however, that ICs and methods constructed or carried out according to the principles of the present invention are applicable in a wide range of signal processing contexts.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
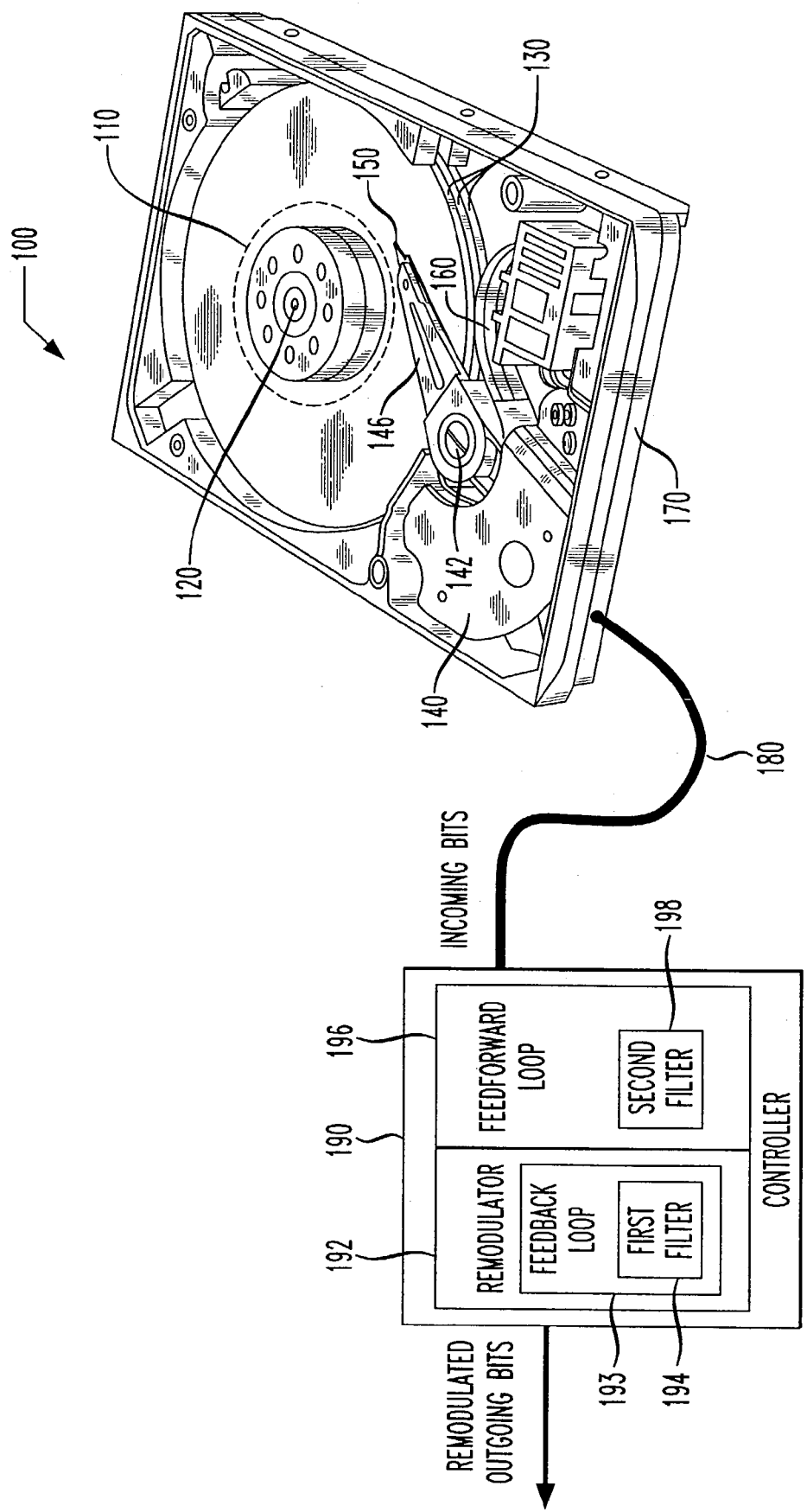
FIG. 1 illustrates a system diagram of an embodiment of a hard disk drive constructed in accordance with the principals of the present invention.

Referring initially to FIG. 1, illustrated is a system diagram of an embodiment of a hard disk drive system, generally designated 100, constructed in accordance with the principals of the present invention. The hard disk drive 100 includes a motor 110, a spindle 120, a storage medium 130, an actuator 140, an actuator axis 142, an actuator arm 146, a read/write head 150, a cable 160, a compartment 170, a connector 180 and a controller 190. The controller 190 includes a remodulator 192 and a feedforward loop 196. The remodulator 192 includes a feedback loop 193 having a first filter 194 and a feedforward loop 196 having a second filter 198.

The hard disk drive 100 provides a medium for storing and retrieving bits of data. In the illustrated embodiment, the hard disk drive 100 provides data storage for a computer. One skilled in the pertinent art will understand the storage and retrieval of data to/from a hard disk drive in a computer. For a more detailed discussion of the operation and components of a hard disk drive, please see "The Indispensable PC Hardware Book," Hans-Peter Messmer, (Addison Wesley Longman, 3d ed. 1997) (1993), incorporated herein by reference.

The motor 110 and the actuator 140 respectively rotate the storage medium 130 and move the read/write head 150 to read/write the bits at designated sectors and tracks on the storage medium 130. The motor 110 rotates the spindle 120 which in turn rotates the storage medium 130. The rotation of the spindle 120 is typically controlled by a feedback control circuit to ensure a constant speed.

The actuator 140 is a mechanical device that moves and controls the actuator arm 146. Located at the center of the actuator 140 is the actuator axis 142 which assists in smoothly moving the actuator arm 146. The actuator arm 146 is a mechanical arm which supports and extends the read/write head 150 over and in-between the storage medium 130.

In the illustrated embodiment, the storage medium 130 includes three disks of an aluminum alloy with a data medium of a magnetizable coating deposited on each side of the disks. In a preferred embodiment, bits within the data medium are encoded in perpendicularly recorded domains.

The read/write head 150 writes the bits onto the storage medium 130 as magnetizations or reads the stored magnetizations as bits. When reading, the read/write head 150 sends the read bits of information or incoming bits to the controller 190 through the cable 160 and the connector 180. The cable 160 may be a standard ribbon cable used in a conventional hard disk drive. The connector 180 may be a conventional flat ribbon cable. In one embodiment, the connector 180 may be flat ribbon cable for a Small Computer System Interface (SCSI).

The controller 190 manages the incoming bits traveling on a channel between the storage medium 130 and the computer. The controller 190 may be located adjacent or within the compartment 170. In some embodiments, the controller 190 may be located on a motherboard of the computer. As stated previously, the controller 190 includes the remodulator 192 and the feedforward loop 196. One skilled in the art will also understand that the controller may include other components such as an analog to digital (A/D) converter that converts the incoming bits from an analog signal to a digital signal.

The remodulator 192 and the feedforward loop 196 process the incoming bits. The remodulator 192 employs the feedback loop 193 with a first filter 194 that reduces an error rate of the incoming bits. The feedback loop 193 may be a decision feedback loop, an error feedback loop or another scheme designed to assist in accurately remodulating the bits. In a preferred embodiment, the remodulator 192 includes a Viterbi detector. After processing, the remodulator 192 yields remodulated outgoing bits. The remodulated outgoing bits may sent to a decoder which combines the remodulated outgoing bits into bytes. The remodulator 192 and the feedforward loop 196 will be discussed below in more detail with respect to FIG. 2.

The second filter 198 of the feedforward loop 196 cooperates with the first filter 194 to further reduce the error rate. The feedforward loop 196 receives the incoming bits from the connector 180 and then sends the incoming bits to the remodulator 192. In a preferred embodiment, the feedforward loop 196 processes the incoming bits by performing baseline wander compensation. In this preferred embodiment, the second filter 198, which is coupled to an input of the remodulator 192, is a high pass filter having a pole setting that is at most 0.2% of a channel clock rate of the controller 190.

Figure 2:
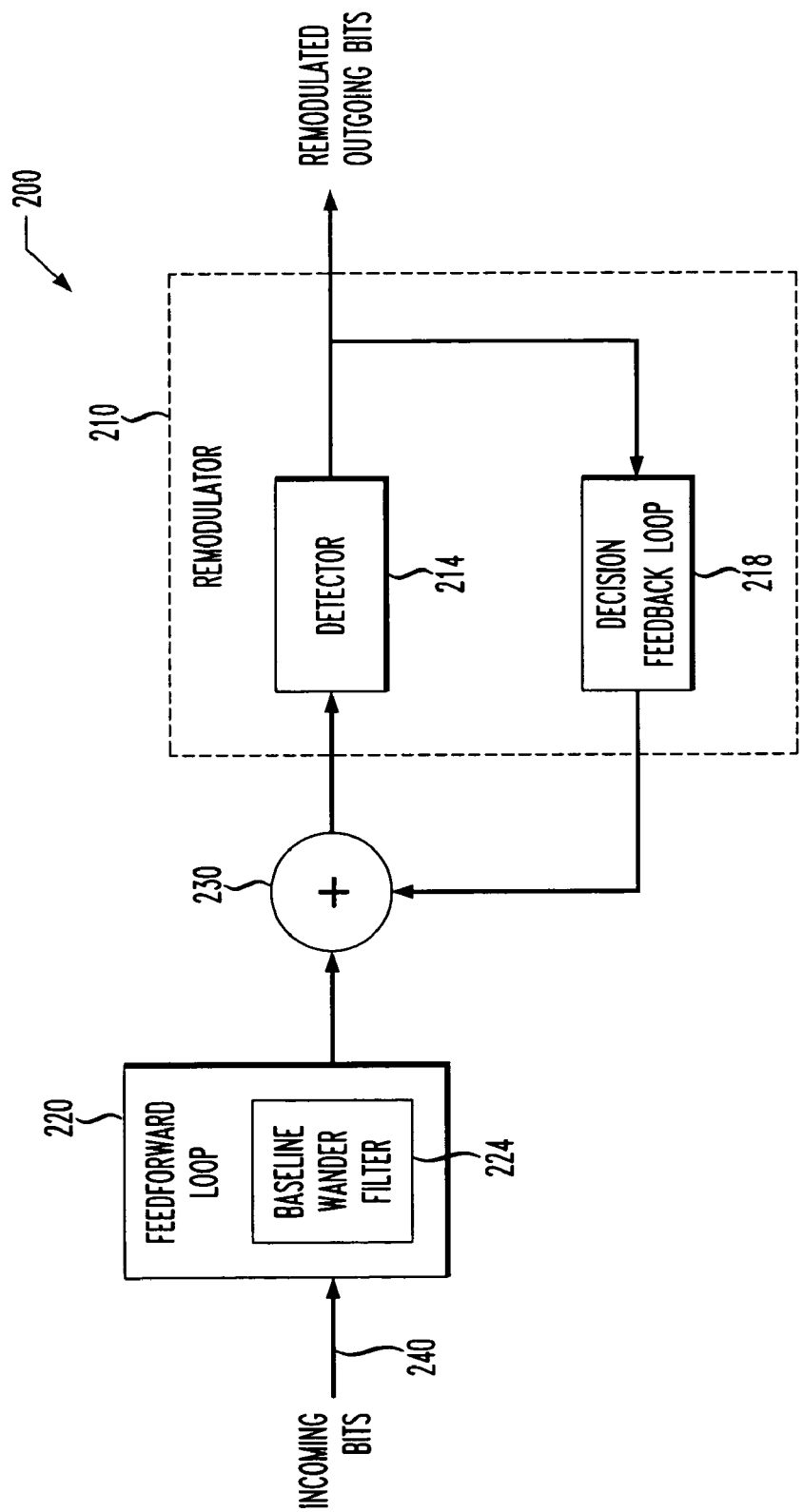
FIG. 2 illustrates a block diagram of an embodiment of an integrated circuit constructed in accordance with the principals of the present invention.

Turning now to FIG. 2, illustrated is a block diagram of an embodiment of an integrated circuit, generally designated 200, constructed in accordance with the principals of the present invention. The integrated circuit 200 includes a remodulator 210, a feedforward loop 220, a summer 230 and a channel 240. The remodulator 210 includes a detector 214 and a decision feedback loop 218. The feedforward loop 220 includes a baseline wander filter 224.

The integrated circuit 200 may be employed in various devices to remodulate data bits and compensate for baseline wander. In one embodiment, the integrated circuit 200 may be employed within a radio frequency receiver. In another embodiment, the integrated circuit 200 may be employed in a device that receives incoming bits which are read from a magnetic storage medium. The magnetic storage medium may be, for example, a hard disk employed within a computer. In a preferred embodiment, the integrated circuit 200 may receive incoming bits that are encoded in perpendicularly recorded domains in the magnetic storage medium.

The remodulator 210 processes the incoming bits received through the channel 240 to yield remodulated outgoing bits. The feedforward loop 220 is coupled to the remodulator 210 through the summer 230. The baseline wander filter 224 of the feedforward loop 220 cooperates with the decision feedback loop 218 to reduce a bit error rate (BER) of the remodulated outgoing bits. The summer 230 may be a conventional digital component that adds the output of the feedforward loop 220 and the decision feedback loop 218 and sends the sum to the detector 214 of the remodulator 210.

The detector 214 may be a conventional detector that recovers a digital signal from the incoming bits resulting in remodulated outgoing bits. In a preferred embodiment, the detector 214 is a Viterbi detector. The Viterbi detector is a common component that employs a Viterbi algorithm to recover a digital signal from the incoming bits. The remodulated outgoing bits from the detector 214 may be sent to a decoder or a target for further processing.

The decision feedback loop 218 also receives the remodulated outgoing bits from the detector 214. The decision feedback loop 218 and the baseline wander filter 224 cooperate to overcome an intrinsic and extrinsic delay from the detector 214. By overcoming the delay, the BER of the remodulated outgoing bits is reduced. A reduction in the BER may enhance the operation of devices which employ the integrated circuit 200. For example, an addition of the integrated circuit 200 to an inferior combination of a read/write head and storage medium may allow the inferior combination to perform comparably to a superior combination which does not employ the integrated circuit 200. Though the signal to noise ratio of the inferior combination may still be greater than the superior combination, the integrated circuit 200 may improve the BER of the inferior combination to that of the superior combination.

In one embodiment, the integrated circuit 200 may be employed with a hard disk drive of a computer. The hard disk drive may employ a pre-amplifier to amplify bits of information read from the hard disk before the bits are sent to an analog to digital converter and then the integrated circuit 200. The pre-amplifier typically employs a high pass analog filter that inhibits a portion of a signal spectrum around the DC resulting in a decrease of the BER at the remodulator 210. The integrated circuit 200 compensates for the high pass filter through the baseline wander filter 224 of the feedforward loop 220. In this embodiment, the baseline wander filter 224 may be a high pass filter having a pole setting that compensates for the high pass filter of the pre-amplifier. More specifically, the baseline wander filter 224 may be a digital filter implementation of a transfer function such as Equation 1.

$$H_F(z) = 1 + (1-q)\frac{z^{-1} - z^{-M-1}}{1 - z^{-1}}. \quad \text{Equation 1}$$

Similarly, the decision feedback loop 218 may an implementation of a transfer function such as Equation 2.

$$H_B(z) = \frac{(1-q)z^{-M-1}}{1 - qz^{-1}}. \quad \text{Equation 2}$$

In Equations 1 and 2, M represents a number of samples of an equalized impulse response of the baseline wander filter 224 and q is a variable based on the high pass pole p of the pre-amplifier filter. In TABLE 1, corresponding values of q and q−1 for various values of p are listed. The values of q are given in terms of a channel bit time of the integrated circuit 200.

TABLE 1

| p | q | 1 − q |
|---|---|-------|
| $\frac{1}{5000}$ | 0.998744 | 0.001256 |
| $\frac{1}{2000}$ | 0.996863 | 0.003137 |

TABLE 1-continued

| p | q | 1 − q |
|---|---|-------|
| $\frac{1}{1000}$ | 0.993736 | 0.006264 |
| $\frac{1}{500}$ | 0.987512 | 0.012488 |
| $\frac{1}{200}$ | 0.969070 | 0.030930 |
| $\frac{1}{100}$ | 0.939082 | 0.060918 |
| $\frac{1}{50}$ | 0.881765 | 0.118235 |

Equations 1 and 2 thus represent filters that may be employed in the feedforward loop 220 and the decision feedback loop 218. Unlike previous compensation schemes employing a decision feedback loop, the implementation of Equations 1 and 2 provide adapted high pass pole compensation (baseline wander filter 224) and a box car filter (decision feedback loop 218) to account for the intrinsic and extrinsic delay of the remodulator 210.

Simulated results of FIG. 2 employing Equations 1 and 2 demonstrate a good performance of baseline wander compensation. Using a signal to noise ratio loss at a BER equal to 1e−3 as a baseline, the integrated circuit 200 provides baseline wander compensation up to a high pass filter of ½00 of a channel clock with a delay of 16 bit times due to the remodulator 210. The integrated circuit 200 provided these favorable results for a channel bit density (cbd) ranging from 1.8 to 2.6 bits with and without jitter noise. Channel bit density is the width of a pulse response at half an amplitude of the pulse response. Cbd provides a measure of intersymbol interference (ISI). The pulse response is a response of the channel 240 to one incoming bit (e.g., . . . 0000100000 . . . ).

Figure 3:
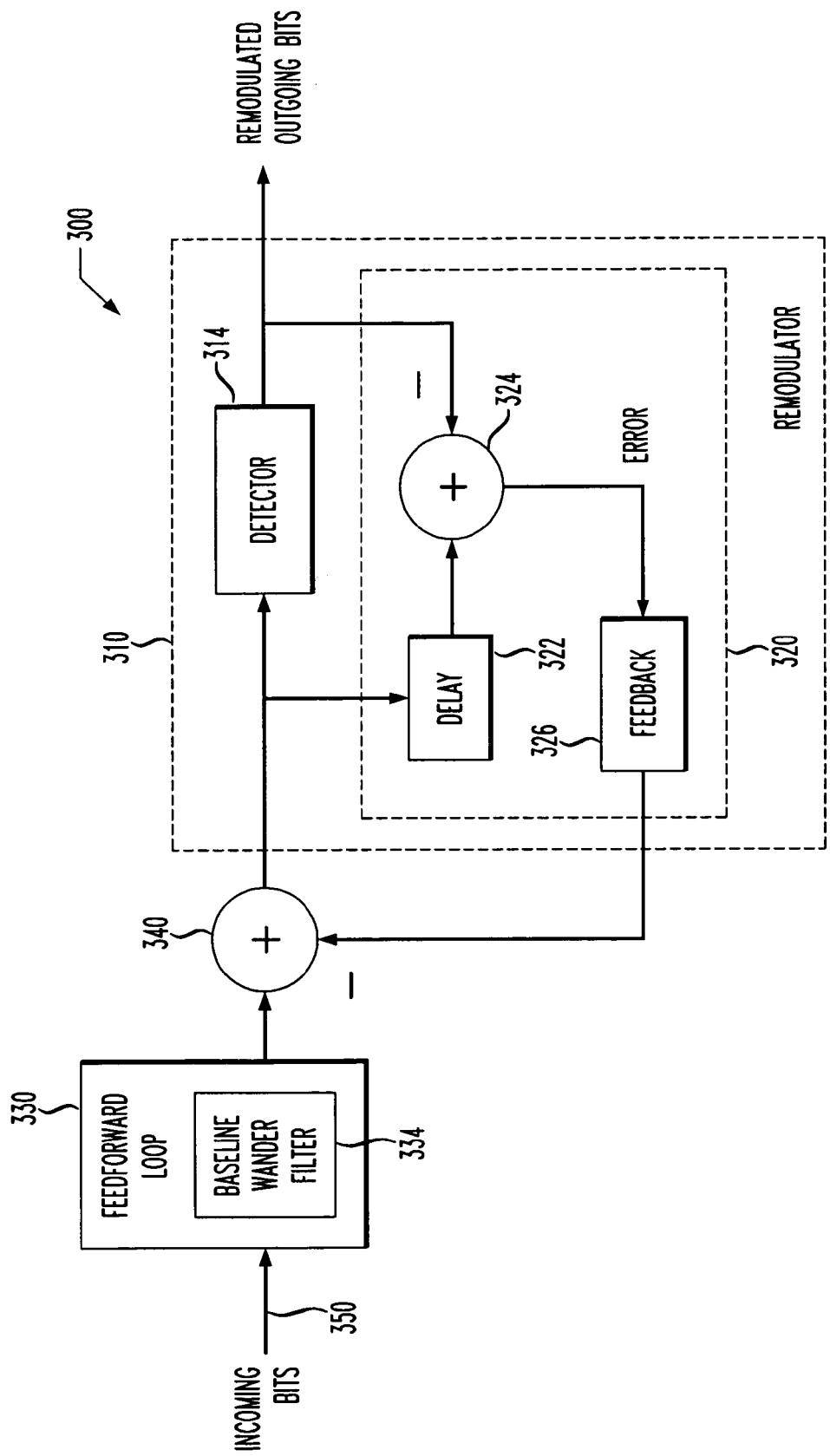
FIG. 3 illustrates a block diagram of yet another embodiment of an integrated circuit constructed in accordance with the principals of the present invention.

Turning now to FIG. 3, illustrated is a block diagram of an embodiment of an integrated circuit, generally designated 300, constructed in accordance with the principals of the present invention. The integrated circuit 300 includes a remodulator 310, a feedforward loop 330, a summer 340 and a channel 350. The remodulator 310 includes a detector 314 and an error feedback loop 320. The error feedback loop includes a delay 322, a feedback summer 324 and a feedback filter 326. The feedforward loop 330 includes a baseline wander filter 334.

As discussed above with respect to the integrated circuit 200 of FIG. 2, the integrated circuit 300 also provides remodulated outgoing bits from incoming bits. The detector 314, the feedforward loop 330 and the summer 340 each function as the detector 214, the feedforward loop 220 and the summer 230 described above with respect to FIG. 2. The remodulator 310, however, differs from the remodulator 210 of FIG. 2 by employing the error feedback loop 320 instead of a design feedback loop.

The error feedback loop 320 is another scheme commonly used for baseline wander compensation. The error feedback loop 320 uses the feedback summer 324 to add a sample from an the output of the summer 340 to the negative of a remodulated outgoing bit from the detector 314 to produce an error signal. Before adding, the sample is delayed by the delay 322. The error signal is sent to the feedback filter 326 before being summed with an output of the feedforward loop 330.

In one embodiment, the integrated circuit 300 may be employed with a hard disk drive of a computer. In this embodiment, the baseline wander filter 334 may be a digital filter implementation of a transfer function such as Equation 3.

$$H_F(z) = \frac{1 - qz^{-1}}{1 - z^{-1}}. \quad \text{Equation 3}$$

Additionally, feedback filter 326 may be an implementation of a transfer function such as Equation 4.

$$H_B(z) = \frac{b(z)z^{-M-1}}{1 - z^{-1}}. \quad \text{Equation 4}$$

In Equations 3 and 4, M is a number of samples of the equalized impulse response of the baseline wander filter 334 and q is a variable based on a high pass pole p of a pre-amplifier filer. The coefficients of the polynomial $b(z) = b^0 + b_1 z^{-1}$ are optimized such that a zero at q is canceled and a maximum absolute value of the remaining roots of the denominator are as close to the origin as possible. Ideally, $b_0$ may vary between 0.0 and 0.23, and $b_1$ may vary between 0.0 and −0.19. Simulation of the integrated circuit 300 produced similar results to those of the integrated circuit 200 simulation. Essentially, the integrated circuit 300 produced a desired signal to noise ratio loss of about zero at a BER of 1e−3 for a cbd ranging from 1.8 to 2.6 bits and a high pass pole up to 1/200 of a channel clock rate. Additionally, the simulations indicated that the integrated circuit 300 works effectively against jitter noise.

Figure 4:
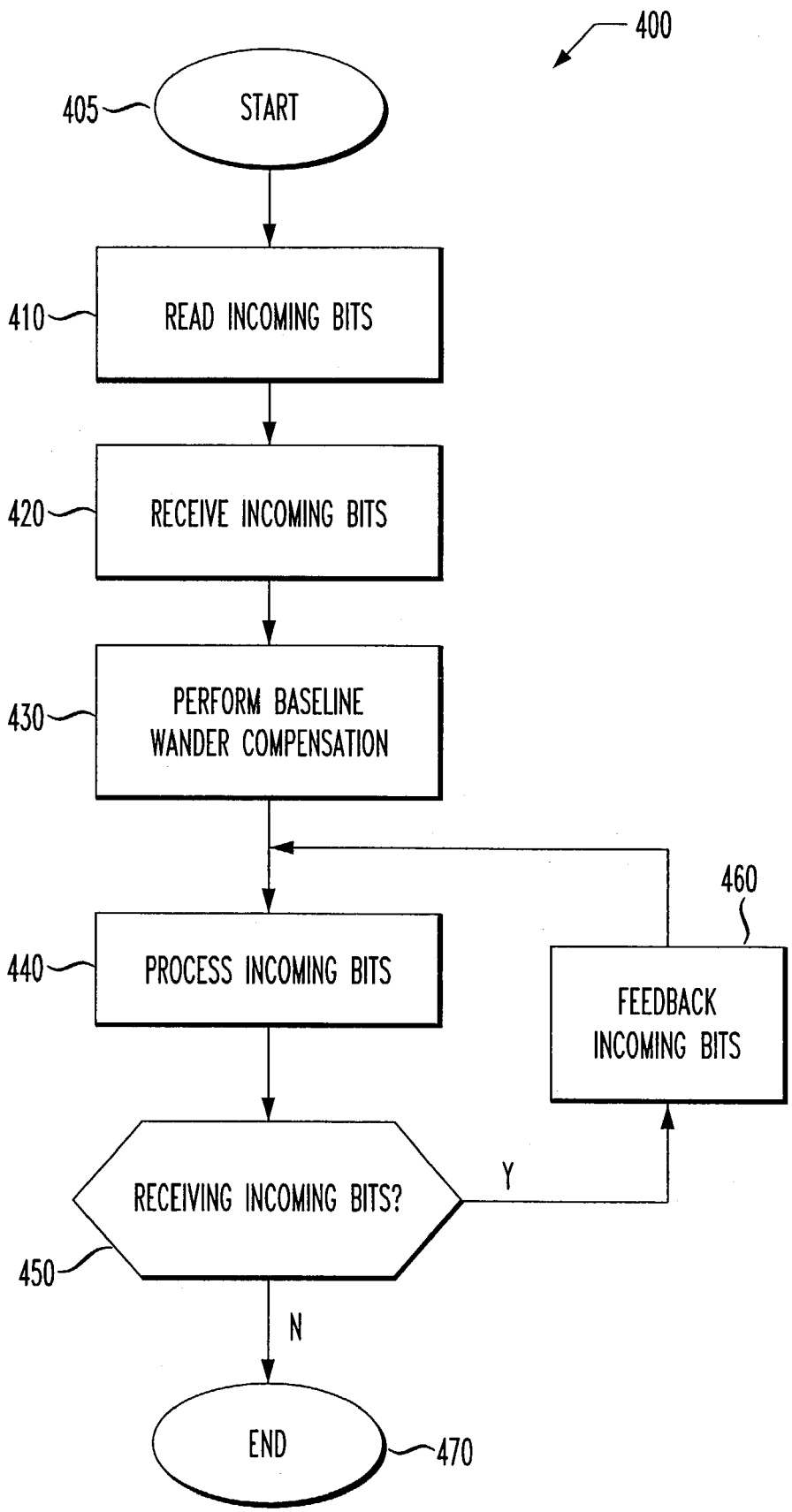
FIG. 4 illustrates a flow diagram of an embodiment of a method of remodulating incoming bits, constructed in accordance with the principles of the present invention.

Turning now to FIG. 4, illustrated is a flow diagram of an embodiment of a method, generally designated 400, of remodulating incoming bits, constructed in accordance with the principles of the present invention. The method 400 starts in a step 405 with an intent to remodulate incoming bits.

After starting, the incoming bits are read from a magnetic storage medium in a step 410. Typically, the incoming bits are read from the magnetic storage medium by a read/write head. In a preferred embodiment, the incoming bits may be encoded in perpendicularly recorded domains in the magnetic storage medium. In one embodiment, the magnetic storage medium may be a hard disk.

After reading the incoming bits, the incoming bits are received by an integrated circuit through a channel in a step 420. As asserted above, the incoming bits may be received after being read from a magnetic storage medium. One skilled in the pertinent art, however, will understand that the integrated circuit may receive the incoming bits via channels of other devices such as a radio frequency receiver.

The integrated circuit may include a feedforward loop coupled to a remodulator. The integrated circuit may be a dedicated device that is constructed of special-purpose hardware employing a sequence of operating instructions which directs its operation. In other embodiments, the integrated circuit may be employed in a device that is solely hardwired or that is solely software enabled using general purpose hardware. In a preferred embodiment, the integrated circuit may be implemented on a silicon chip employing individual registers, multipliers and adders.

After receiving the incoming bits, the integrated circuit performs baseline wander compensation in a step 430. The integrated circuit may perform baseline wander compensation in the feedforward loop. In a preferred embodiment, the feedforward loop includes a high pass filter that has a pole which is at most 0.2% of a channel clock rate. The channel clock rate may be the channel clock rate of the integrated circuit.

After performing baseline wander compensation, the incoming bits are processed in a step 440. The incoming bits are processed by the remodulator implemented in the integrated circuit. The remodulator processes the incoming bits to yield remodulated outgoing bits. The remodulator may process the incoming bits by employing a detector to recover a digital signal from the incoming bits. The digital signal may be, for example, the stored incoming bits from the magnetic storage medium. The remodulator includes a feedback loop to assist in yielding remodulated outgoing bits.

After processing the incoming bits, a determination is made if the integrated circuit is still receiving incoming bits in a decisional step 450. If the determination is made that the integrated circuit is not receiving incoming bits, then remodulating incoming bits ends in a step 470. Returning now to the decisional step 450, if the integrated circuit is still receiving incoming bits, the remodulator feedbacks the incoming bits in a step 460. In some embodiments, the remodulator may feedback the incoming bits employing a decision feedback loop or an error feedback loop. After the remodulator feedbacks the incoming bits, then the method 400 proceeds to step 440 and continues as before.

Although the present invention has been described in detail, those skilled in the art should understand that they can make various changes, substitutions and alterations herein without departing from the spirit and scope of the invention in its broadest form.

What is claimed is:

1. An integrated circuit, comprising:
a remodulator having a detector configured to recover a digital signal from incoming bits from a magnetic storage medium to yield remodulated outgoing bits, said remodulator including an error feedback loop having a feedback summer configured to produce an error signal by adding a delayed sample of an input of said detector to a negative of one of said remodulated outgoing bits; and
a feedforward loop coupled to an input of said remodulator and having a baseline wander filter, said baseline wander filter configured to cooperate with said error feedback loop to compensate for a delay associated with said detector to reduce a bit error rate of said remodulated outgoing bits.

2. The integrated circuit as recited in claim 1 wherein said detector is a Viterbi detector.

3. The integrated circuit as recited in claim 1 wherein said baseline wander filter is a high pass filter having a pole setting that is at most 0.2% of a channel clock rate.

4. The integrated circuit as recited in claim 1 wherein said magnetic storage medium is a hard disk drive that employs a pre-amplifier with a high-pass filter to amplify said incoming bits, said baseline wander filter configured to compensate for said high-pass filter.

5. The integrated circuit as recited in claim 1 wherein said incoming bits are encoded in perpendicularly recorded domains in said magnetic storage medium.

6. A method of remodulating incoming bits from a magnetic storage medium, comprising:
- recovering a digital signal from said incoming bits to yield remodulated outgoing bits in a remodulator implemented in an integrated circuit, said remodulator including an error feedback loop having a feedback summer configured to produce an error signal by adding a delayed sample of an input of said detector to a negative of one of said remodulated outgoing bits;
- performing baseline wander compensation employing a baseline wander filter in a feedforward loop coupled to an input of said remodulator; and
- said baseline wandering filter cooperating with said error feedback loop to compensate for a delay associated with said recovering to reduce a bit error rate of said remodulated outgoing bits.

7. The method as recited in claim 6 wherein said remodulator includes a Viterbi detector employed for said recovering.

8. The method as recited in claim 6 wherein said baseline wander filter is a high pass filter having a pole setting that is at most 0.2% of a channel clock rate.

9. The method as recited in claim 6 wherein said magnetic storage medium is a hard disk drive that employs a pre-amplifier with a high-pass filter to amplify said incoming bits, said method further comprising said baseline wander filter compensating for said high-pass filter.

10. The method as recited in claim 6 wherein said incoming bits are encoded in perpendicularly recorded domains in said magnetic storage medium.

11. A controller for a disk drive having a magnetic storage medium associated therewith, comprising:
- a remodulator having a detector configured to recover a digital signal from bits read from said magnetic storage medium to yield remodulated outgoing bits, said remodulator employing a feedback loop having a first filter to reduce an error rate of said bits and a feedback summer configured to produce an error signal by adding a delayed sample of an input of said detector to a negative of one of said remodulated outgoing bits; and
- a feedforward loop having a second filter coupled to an input of said remodulator, said first and second filters configured to cooperate to compensate for a delay associated with said detector to reduce further said error rate.

12. The controller as recited in claim 11 wherein said detector is a Viterbi detector.

13. The controller as recited in claim 11 wherein said second filter is a high pass filter having a pole setting that is at most 0.2% of a channel clock rate.

14. The controller as recited in claim 11 wherein said magnetic storage medium is a hard disk drive that employs a pre-amplifier with a high-pass filter to amplify said incoming bits, said second filter configured to compensate for said high-pass filter.

15. The controller as recited in claim 11 wherein said bits are encoded in perpendicularly recorded domains in said magnetic storage medium.

16. A hard disk drive, comprising:
- a motor;
- a storage medium coupled to said motor for rotation thereby;
- a read/write head proximate at least one surface of said storage medium;
- a remodulator having a detector that recovers a digital signal from bits read by said read/write head to yield remodulated outgoing bits, said remodulator employing a feedback loop having a first filter to reduce an error rate of said bits and a feedback summer configured to produce an error signal by adding a delayed sample of an input of said detector to a negative of one of said remodulated outgoing bits; and
- a feedforward loop having a second filter coupled to an input of said remodulator, said first and second filters configured to cooperate to compensate for a delay associated with said detector to reduce further said error rate.

17. The disk drive as recited in claim 16 wherein said detector is a Viterbi detector.

18. The disk drive as recited in claim 16 wherein said second filter is a high pass filter having a pole setting that is at most 0.2% of a channel clock rate.

19. The disk drive as recited in claim 16 wherein said bits are encoded in perpendicularly recorded domains in said storage medium.

20. The integrated circuit as recited in claim 4 wherein said baseline wander filter is implemented based on a high-pass pole of said high-pass filter.

21. The disk drive as recited in claim 16 further comprising a pre-amplifier to amplify bits read by said read/write head, said pre-amplifier having a high-pass filter and said second filter configured to compensate for said high-pass filter.

* * * * *